Patented May 16, 1933

1,909,195

UNITED STATES PATENT OFFICE

FREDERICK C. HAHN, OF WILMINGTON, DELAWARE, ASSIGNOR TO E. I. DU PONT DE NEMOURS & COMPANY, OF WILMINGTON, DELAWARE, A CORPORATION OF DELAWARE

RESIN-LIKE ESTER

No Drawing. Application filed July 27, 1928. Serial No. 295,857.

This invention relates to the art of coating compositions, and more particularly to coating compositions containing cellulose derivatives.

The quick-drying coating compositions, often referred to as lacquers, now on the market are made out of cellulose nitrate, one or more resins, one or more softeners and a solvent. For various reasons, it is desirable to use cellulose acetate as the base for such coating compositions but I have found that none of the ordinary natural resins are compatible with cellulose acetate, hence it is not possible to make these compositions by merely substituting cellulose acetate for cellulose nitrate.

I have found, however, that resin-like materials which are readily miscible with cellulose acetate as well as with cellulose nitrate and ethyl cellulose can be prepared by treating a monoalkyl ether of glycerin with organic acids containing, in addition to the carboxylic acid group and/or groups, at least one other group having an oxygen atom and consisting of an ester group, a ketone group, a hydroxyl group or an ether group.

It is therefore an object of this invention to produce resin-like materials which are miscible with cellulose derivatives.

It is another object of this invention to produce coating compositions using cellulose derivatives as the base.

With the above and other objects in view, which will be apparent as the description proceeds, I have set forth below several embodiments of my invention by way of illustration and not as a limitation.

The resin-like materials used in the following compositions are prepared by heating substantially one mol of monoethylin with two mols of a monocarboxylic acid containing more than one type of active group, for example, benzoylbenzoic acid, at 175–250° C. for 3–14 hours.

Example 1

| | Parts by weight |
|---|---|
| Cellulose acetate | 12 |
| Monoethylin benzoylbenzoate | 3 |
| Triacetin | 6 |
| Solvent | 179 |

Example 2

| | Parts by weight |
|---|---|
| Cellulose acetate | 12 |
| Monoethylin dilactate | 12 |
| Dibutyl tartrate | 6 |
| Solvent | 79 |

Example 3

| | Parts by weight |
|---|---|
| Cellulose acetate | 12 |
| Monomethylin benzoylbenzoate | 3 |
| Dimethyl phthalate | 6 |
| Solvent | 179 |

Example 4

| | Parts by weight |
|---|---|
| Cellulose nitrate | 12 |
| Monoethylin benzoylbenzoate | 6 |
| Dibutyl phthalate | 4 |
| Solvent | 178 |

It will be apparent that a wide variety of solvents may be used in forming coating compositions of the type set forth herein, but a solvent which I have found highly satisfactory consists of acetone 17%, ethyl acetate 10%, ethyl alcohol 8%, toluene 20%, monomethyl ether of ethylene glycol 22%, acetone oil fraction boiling from 90–150° C. 20%, and diacetone alcohol 3%.

The above coating compositions are produced by mixing the ingredients in the proportions indicated in the ordinary way, Examples 1, 3 and 4 forming coating compositions suitable for spraying, and Example 2 forming a coating composition suitable for brushing.

Although the examples set forth above are limited to the use of resin-like materials formed by using benzoylbenzoic acid and lactic acid, it will be understood that other organic acids containing, in addition to the carboxylic acid group and/or groups, at least one other group having an oxygen atom, such as pyruvic acid, salicylic acid and tartaric acid may be substituted for benzoylbenzoic acid or lactic acid for reaction with the monoethylin or monomethylin, or any desired mixtures of these acids may be used for this purpose.

It will also be apparent that in place of monoethylin or monomethylin I can use other monoalkyl ethers or glycerin, such as monopropylin and monobutylin.

Where a dicarboxylic acid, such as tartaric acid, is used, three mols of this acid are usually heated with three mols of a monoalkyl ether of glycerin.

However, in making the resin-like materials disclosed herein it is sometimes desirable to vary the proportions of the ingredients and use an excess of one or the other. In such cases, if it is desired to remove the excess, this may be done in any known way, as by blowing an inert gas through the heated mass.

Coating compositions containing resinous esters of glycerin and organic acids containing, in addition to the carboxylic acid group and/or groups, at least one other group having an oxygen atom, are disclosed and claimed in one of my co-pending applications filed of even date herewith.

As many apparently widely different embodiments of this invention may be made without departing from the spirit thereof, it is to be understood that I do not limit myself to the foregoing examples, proportions or description except as indicated in the following patent claims.

I claim:

1. The process of forming resin-like materials which consists in heating monoethylin with benzoylbenzoic acid.

2. The process of forming resin-like materials which consists in heating a monoalkyl ether of glycerine with benzoylbenzoic acid.

3. The process of forming resin-like material which consists in heating 1 mol of a monoalkyl ether of glycerine with 2 mols of benzoylbenzoic acid at 175–250° C. for 3–14 hours.

4. As a new resin-like product, a benzoylbenzoate of a monoalkyl ether of glycerin.

5. As a new resin-like product, a benzoylbenzoate of monoethylin.

6. A process of forming resin-like materials which comprises esterifying a monoalkyl ether of glycerin with an organic acid containing a group having an oxygen atom and being selected from the class consisting of ester, ketone, hydroxyl and ether groups.

7. A process of forming resin-like materials which comprises heating a monoalkyl ether of glycerin with a carboxylic acid selected from the class consisting of keto carboxylic acids and hydroxy carboxylic acids.

8. A process of forming resin-like materials which comprises heating a monoalkyl ether of glycerin with a keto carboxylic acid.

9. A resinous ester of a monoalkyl ether of glycerine with an organic acid containing a group having an oxygen atom and being selected from the class consisting of ester, ketone, hydroxyl and ether groups.

10. A resinous ester of a monoalkyl ether of glycerin with a carboxylic acid selected from the class consisting of keto carboxylic acids and hydroxy carboxylic acids.

11. A resinous ester of a monoalkyl ether of glycerin with a keto carboxylic acid.

In testimony whereof, I affix my signature.

FREDERICK C. HAHN.